United States Patent [19]

Wermers et al.

[11] Patent Number: 5,490,875
[45] Date of Patent: Feb. 13, 1996

[54] ADHESIVE COMPOSITION FOR CIGARETTE SEAMS

[75] Inventors: Vilas Wermers, Lemont, Ill.; Michael Romanovich, Cherry Hill, N.J.

[73] Assignee: American Maize Technology, Inc., Dimmitt, Tex.

[21] Appl. No.: 91,221

[22] Filed: Jul. 13, 1993

[51] Int. Cl.$^6$ ........................................................ C08L 3/02
[52] U.S. Cl. ........................ 106/208; 106/209; 106/213; 106/214; 131/69
[58] Field of Search ................................. 106/208, 213, 106/209, 214; 131/69

[56] References Cited

U.S. PATENT DOCUMENTS

| | | | |
|---|---|---|---|
| 436,682 | 9/1890 | Weisert | 131/69 |
| 3,200,012 | 8/1965 | Hay | 127/38 |
| 3,212,924 | 10/1965 | Asnes | 106/208 |
| 3,527,606 | 9/1970 | Taylor et al. | 127/71 |
| 4,095,990 | 6/1978 | Kinigsberg | 106/136 |
| 4,175,996 | 11/1979 | Battard et al. | 156/336 |
| 4,776,351 | 10/1988 | Wahle et al. | 131/69 |
| 4,936,920 | 6/1990 | Keritsis et al. | 131/77 |
| 5,024,241 | 6/1991 | Hulsman et al. | 131/84.2 |
| 5,271,766 | 12/1993 | Koutlakis et al. | 106/208 |

FOREIGN PATENT DOCUMENTS

| | | | |
|---|---|---|---|
| 453200 | 12/1948 | Canada | 106/208 |
| 3914556 | 2/1990 | Germany . | |
| 442398 | 2/1936 | United Kingdom | 106/208 |
| 518010 | 2/1940 | United Kingdom | 106/208 |

*Primary Examiner*—Anthony Green
*Attorney, Agent, or Firm*—Lucas & Just

[57] ABSTRACT

The adhesive composition is a cooked blend of a waxy starch white dextrin and a waxy starch hydrolysate having a DE of around 20. The adhesive composition can be made to have a solids level of up to 70% and the ratio of dextrin to hydrolysate in the adhesive is 1:1 to 1:2.

20 Claims, No Drawings

ADHESIVE COMPOSITION FOR CIGARETTE SEAMS

This invention relates to an adhesive composition which is especially suited for use in the manufacture of cigarettes and, more particularly, for gluing the longitudinal seam of a cigarette manufactured in a high-speed machine operation.

Cigarettes are generally made by wrapping cut, dried tobacco in paper to form a cylindrically shaped product with a seam that runs the entire length of the cigarette. An adhesive is used to secure this longitudinal seam. If the cigarette has a filter, then an adhesive is also used both to form the filter and to secure the filter to the paper.

Most cigarettes are manufactured using high-speed machines which produce anywhere from 2,000 to 12,000 cigarettes per minute. These fast machine speeds require adhesive formulations with a high solids content and a low viscosity so that they can be quickly applied to the paper and rapidly dried thereon. Conventionally, synthetic emulsified resins provided the necessary functional requirements. It is essential that cigarette seam adhesives have a high solids content, low viscosity and a good paper penetration rate.

The chemical composition of cigarette smoke has come under close scrutiny by both governmental authorities and anti-smoking groups. The combustion products of the synthetic emulsified resins used in cigarette seam adhesives form part of the cigarette smoke. With the pressures currently on the tobacco industry, there is a need to produce a cigarette with a high degree of natural products.

U.S. Pat. No. 5,155,140 issued Oct. 13, 1992 suggests using a gum arabic base adhesive in combination with other starch-based materials. The '140 patent teaches that suitable other starch-based materials include chemically modified starch, white and yellow dextrins and gelatinized starch. Gum arabic (acacia) is a non-converted carbohydrate obtained from the plant Acacia Senegal and related species of the Acacia.

European Patent Application/Publication No. 458,233 A2 published Nov. 27, 1991 suggests using a combination of a crosslinked starch with a fluidity or converted starch. Both starches have an amylopectin content of at least 70% by weight. Crosslinked starch is a modified starch in which a non-carbohydrate component has been introduced to provide the crosslinking.

It has now been discovered that a cigarette seam adhesive composition can be made solely from natural starch-based products without the need for chemically modified starch or crosslinked starch. The adhesive composition of the present invention comprises an admixture of two converted starch-based products which have no non-natural component. Specifically, it has been discovered that an aqueous admixture of a high amylopectin dextrin and a high amylopectin starch hydrolysate having a Dextrose Equivalent (DE) of about 10 to about 30 produces a very acceptable cigarette seam adhesive with a high rate of penetration into the paper. It has also been found that the adhesive formulation of the present invention has a low viscosity and is able to operate in a high-speed cigarette manufacturing machine at high solids concentration. Additionally, the adhesive formulation of the present invention has been found to have excellent viscosity stability compared to conventional dextrin-based adhesives.

Neither the dextrin nor the starch hydrolysate used in the present invention is chemically modified in any way, such as by crosslinking, esterification or etherification; rather, both components are converted directly from starch. In fact, both the preferred dextrin and preferred starch hydrolysate used in the adhesive formulation of the present invention are classified as Generally Recognized As Safe (GRAS) by the U.S. Food and Drug Administration.

Dextrins have been used in adhesives in the past; however, aqueous slurries of dextrins at high solids levels are too viscous for use in high-speed cigarette machines and, although having the appropriate viscosity range at low solids levels, have a high water content and, therefore, a longer drying time. Thus, dextrins are not generally used in cigarette seam adhesive formulations.

The adhesive composition of the present invention is used in an all aqueous phase at high solids content thereby providing excellent penetration into the paper to allow for high-speed manufacture. Additionally, the use of all natural products has the added benefit of eliminating non-natural substances from the cigarette smoke.

Broadly, the adhesive composition of the present invention comprises a cooked aqueous blend of a high amylopectin starch dextrin and a high amylopectin starch hydrolysate, said dextrin being prepared from a starch having an amylopectin content of at least about 70% and said hydrolysate being prepared from a starch having an amylopectin content of at least about 70%, said dextrin having a cold funnel viscosity of about 20 mls to about 120 mls when measured at about 42% solids, dry basis, said hydrolysate having a Dextrose Equivalent (DE) of about 10 to about 30, said cooked blend having a Brookfield viscosity of about 500 cps to about 15,000 cps when measured at a solids content of about 60% by weight and a temperature of about 25° C.

The weight ratio of dextrin to hydrolysate in the adhesive formulation made in accordance with the present invention is preferably about 1:0.5 parts to about 1:4 parts. More preferably, the weight ratio of dextrin to hydrolysate is about 1:1 parts to about 1:2 parts by weight.

The adhesive formulation made in accordance with the present invention is a cooked aqueous blend of the dextrin and hydrolysate. Generally, the amount of water is kept to a minimum to maximize the solids content of the adhesive and to promote fast drying of the adhesive. Preferably, the solids content of the adhesive is about 50% by weight solids and above and, more preferably, about 60% by weight solids and above. Good results have been obtained with an adhesive formulation having a solids content of about 50% to about 70% by weight.

Additionally, a preservative can be added to the adhesive formulation made in accordance with the present invention to control microbiological growth. Any suitable preservative can be used, such as potassium sorbate, p-hydroxybenzoic acid ester and halogenated hydrocarbons. Good results have been obtained with potassium sorbate. The amount of preservative added to the adhesive made in accordance with the present invention is below about 0.1 part by weight and generally about 0.05 parts by weight adhesive and below. Good results have been obtained with about 0.03 parts by weight of potassium sorbate.

The adhesive composition made in accordance with the present invention is a cooked aqueous blend comprising about 20 to about 60 parts by weight water; about 10 to about 45 parts by weight of said dextrin; about 15 to about 60 parts by weight of said starch hydrolysate; and below about 0.1 part by weight preservatives. More preferably, the cooked blend comprises about 30 to about 50 parts by weight water; about 20 to about 30 parts by weight dextrin; about 25 to about 45 parts by weight hydrolysate; and about 0.05 parts by weight and below preservative. Good results have been obtained with an adhesive blend comprising about 35 to about 45 parts by weight water; about 25 parts by weight dextrin; and about 30 to about 40 parts by weight starch hydrolysate; and about 0.03 parts by weight preservatives. The preservatives need not be in the formulation.

The high amylopectin dextrin used in accordance with the present invention is preferably a white dextrin made from a high amylopectin starch. The high amylopectin starch is converted to a white dextrin in a conventional manner using conventional equipment. Dextrins are typically classified as white dextrins, yellow or canary dextrins and British gums. The difference between these three types is generally in the way they are manufactured. Typically, white dextrins are roasted at about 110° C. to about 130° C. for about 3 to about 7 hours with a large amount of catalyst. As their name implies, they are white to cream in color. Canary dextrins are typically roasted at about 135° C. to about 160° C. for about 8 to about 14 hours with a medium amount of catalyst. Their color is generally buff to dark tan. British gums are conventionally roasted at about 150° C. to about 180° C. for about 10 to about 24 hours. Their color is typically light tan to dark tan.

The high amylopectin dextrin used in the present invention has a cold funnel viscosity of about 20 to about 120 mls when measured at about 42% solids, dry basis. Good results have been obtained with a high amylopectin dextrin having a cold funnel viscosity of about 50 to about 80 mls.

Cold funnel viscosity as used in the specification and claims is measured by determining the number of milliliters of paste that pass through a funnel in one minute. Specifically, 160 grams of dextrin at 5% moisture are mixed with 200 grams of water (1:1.25 parts water to parts dextrin, 42.22% solids, dry basis) and then cooked in a steam bath to raise the temperature of the slurry to 190° F. (88° C.) in 2.5 to 3.0 minutes. Then, the paste is removed to the top of the steam bath and the temperature maintained at 190° F. (88° C.) until the total time elapsed is 3.5 minutes. Next, the paste is moved to a water bath at a temperature of 50° F. (10° C.) and cooled to 75° F. (24° C.). Through the cooking and cooling processes, the paste is gently stirred. Next, the paste is poured into a funnel that was a 100 mm diameter Pyrex 60° angle funnel which has a stem (ID 0.8 cm) measuring 9.5 cm from the vertex of the funnel to the rim and fitted with a stainless steel tip (1.99 mm ID opening). The overall height of the funnel from tip to rim is 18.5 cm. The funnel is filled to a level of 2 cm below the rim of the funnel and paste is allowed to flow through the funnel and the stem for exactly one minute, keeping the level of paste in the funnel constant. Prior to collecting the paste, the paste is allowed to flow through the funnel and the stem for 20 seconds to condition the funnel stem and the tip. The paste is collected in a graduated cylinder and allowed to settle to allow air bubbles to escape. Then the total volume of fluid in the cylinder is read as cold funnel viscosity (in milliliters). Prior to use, the funnel is kept in a water bath at a temperature of 75° F. (24° C.).

In one specific example, a high amylopectin dextrin for use in accordance with the present invention was prepared by spraying a waxy maize starch (essentially 100% amylopectin) with hydrogen chloride gas to bring the pH of the starch to about 3. The acidified starch was then roasted at about 105° C. for about 2 to about 4 hours in a conventional vertical cooker. The Brookfield viscosity of this dextrin at 40% solids and 20 r.p.m. was about 500 cps.

Any conventional dry roasting apparatus may be used, such as the known bulk cookers, fluidized bed dextrinizers or kiln type cookers. U.S. Pat. No. 3,200,012 describes one form of cylindrical drum roaster and U.S. Pat. No. 3,527,606 describes a paddle type roaster which may be conveniently employed for dextrinizing the high amylopectin starch.

Roasting temperature may range from about 90° C. up to 160° C. and more depending on the type of roaster employed for a period of time of from about 2 up to about 8 hours to obtain a dextrin of the desired viscosity.

The high amylopectin starch hydrolysate used in accordance with the present invention is made in a conventional manner using conventional equipment. The catalyst used to form the high amylopectin starch hydrolysate used in the present invention can be either acid, enzyme or a combination thereof. The preferred catalyst is enzyme, and specifically bacterial alpha amylase.

The reaction is allowed to proceed until the desired DE is obtained. In accordance with the present invention, the high amylopectin starch hydrolysate should have a DE of about 10 to about 30 and, more preferably, about 15 to about 20. Dextrose Equivalent (DE) is measured in a conventional manner using the Lane Eynon method CRA E-26 dated May 27, 1968.

In order to acid treat the starch, a slurry of starch of about 5% to about 40% by weight starch is prepared. This slurry is reacted with acid, generally a strong acid, at a temperature above gelatinization temperature. Such a procedure is preferably carried out by jet cooking the slurry through a conventional jet cooker with or without acid already in the slurry and then allowing the slurry to react with the acid, adding acid if needed, until the desired DE is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying.

Suitable acids for use in making the high amylopectin starch hydrolysate used in the present invention include hydrochloric and sulfuric; dilute hydrochloric acid is preferred.

In order to enzyme treat the starch, a slurry of starch is made up having about 5% to about 40% by weight starch. To this slurry enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable, then the enzyme can be added to the slurry prior to jet cooking. The slurry may also be treated with acid first to a low DE and then enzyme treated. After enzyme treatment, the product is dewatered and dried. Alternatively, the product may be subjected to conventional carbon bleaching and filtration prior to concentration and/or drying.

A combination of the acid and enzyme may be used to make the starch hydrolysate as mentioned above. For instance, the starch can be jet cooked with acid to a DE of, say, 5 and then the pH is adjusted and enzyme added to complete the conversion of the starch to the desired DE.

Suitable enzymes for use in making the high amylopectin starch hydrolysate used in the present invention include bacterial alpha amylase and fungal alpha amylase; bacterial alpha amylase is preferred.

The dextrin and the hydrolysate used in the present invention are made from starches which have an amylopectin content of at least about 70% and, more preferably, about 75% and above. Suitable starches for use in making the converted starch in accordance with the present invention include waxy maize, waxy rice, tapioca, potato, maize, wheat, arrowroot and sago. The preferred source of starch is maize and, more preferably, waxy maize. Thus, the preferred dextrin is a waxy maize dextrin and the preferred hydrolysate is a waxy maize starch hydrolysate. The amylopectin content of a starch is determined indirectly by measuring the amylose content or, more precisely, the apparent amylose content through a conventional iodine absorption test, the assumption being that starch contains only two distinct polymers, amylose and amylopectin, the sum of which adds up to 100%.

Starch may be characterized as a polymer made from alpha-D-glucose monomers. The polymer is formed through biosynthesis in plants and, hence, is more accurately referred to as a biopolymer. Acetal linkages form the bonds between the monomers and there are, to date, only two known covalent bonds formed between the monomers during biosynthesis, alpha 1-4 and alpha 1-6. Traditionally, the alpha 1-6 linkage has been referred to as being a branch point for the polymer. Alpha-D-glucose polymers containing both alpha 1-4 and alpha 1-6 linkages were referred to as amylopectin while alpha-D-glucose polymers containing only alpha 1-4 linkages were referred to as amylose.

Commercially, there have been four varieties of corn starch available: waxy, common, and two varieties of conventional high amylose, one having an apparent amylose content of 50% and the other having an apparent amylose content of 70%. Waxy corn starch is homozygous in the recessive waxy gene, wx.

Traditionally, one of the features used to distinguish starches was amylose content as determined by an assay with iodine, i.e. apparent amylose content. Waxy starch was considered to contain no measurable amylose but only amylopectin. Common corn starch was reported to have an apparent amylose content of 27%.

In order to make the adhesive of the present invention, the dextrin and the hydrolysate are mixed with water to the desired solids level using conventional equipment and the blend is then cooked. A preservative may be added to the blend to control microbial growth. The resulting cooked aqueous blend has been found to have good viscosity characteristics at high solids levels which make the cooked aqueous blend an excellent adhesive for use in the manufacture of cigarettes. Specifically, a solids level of about 60% by weight of the adhesive composition of the present invention has a Brookfield viscosity of about 500 cps to about 15,000 cps. This Brookfield viscosity is an initial viscosity measured at 25° C. at 20 rpm using a RVF-100 viscometer, the viscosity measurement being on a cooked blend which has cooled down to about 25° C.

The blend is cooked at a temperature of about 90° C. to about 100° C. (195°–210° F.) for a period of at least about 20 minutes. Generally, cooking lasts about 20 to about 30 minutes. During blending and cooking the slurry is subjected to mild agitation using conventional equipment in a conventional manner.

Preferably, the cigarette manufacturer uses either a dry blend of the hydrolysate and dextrin which is then added to water or combines both the dry dextrin and the dry hydrolysate with water and cooks the aqueous mixture at about 90° C. (195° F.) for about 20 to about 30 minutes with agitation no more than about two to about three days before use. The adhesive composition is then stored at a temperature of about 50° C. to about 60° C. prior to use. Applying the adhesive composition of the present invention at the elevated temperature of about 50° C. to about 60° C. aids in driving off the moisture and allows for a faster set.

The adhesive composition of the present invention is especially suited for high-speed cigarette manufacture; however, it is also suitable for use in cigar manufacture or as a general adhesive.

These and other aspects of the present invention may be more fully understood by reference to the following examples.

EXAMPLE 1

An adhesive composition was prepared by mixing 25 parts by weight of a waxy maize dextrin, cold funnel viscosity of about 50 to about 80 mls, and 3D parts by weight of a waxy maize starch hydrolysate prepared by enzyme hydrolysis to a DE of 17 with 45 parts water and 0.03 parts potassium sorbate as a preservative. The blend had an initial Brookfield viscosity of 900 cps when measured at 25° C. and 20 rpm and solids content of 55%.

The adhesive composition was cooked and the resulting adhesive had good adhesion properties.

EXAMPLE 2

An adhesive composition was prepared by mixing 25 parts by weight of a waxy maize dextrin, cold funnel viscosity of about 50 to about 80 mls, and 35 parts by weight of a waxy maize starch hydrolysate prepared by enzyme hydrolysis to a DE of 17 with 40 parts water and 0.03 parts potassium sorbate as a preservative. The blend had an initial Brookfield viscosity of 2,560 cps when measured at 25° C. and 20 rpm and solids content of 60%.

The adhesive composition was cooked and the resulting adhesive had good adhesion properties.

EXAMPLE 3

An adhesive composition was prepared by mixing 25 parts by weight of a waxy maize dextrin, cold funnel viscosity of about 50 to about 80 mls, and 40 parts by weight of a waxy maize starch hydrolysate prepared by enzyme hydrolysis to a DE of 17 with 35 parts water and 0.03 parts potassium sorbate as a preservative. The blend had an initial Brookfield viscosity of 10,740 cps when measured at 25° C. and 20 rpm and solids content of 65%.

The adhesive composition was cooked and the resulting adhesive had good adhesion properties.

EXAMPLE 4

A preferred adhesive composition made with the white waxy dextrin having a cold funnel viscosity of about 50 to about 80 mls at 42% solids and waxy starch hydrolysate (DE 17) of the present invention was compared to an adhesive formulation from a canary waxy dextrin and a waxy starch hydrolysate (DE 17) for both taste and appearance. The preferred adhesive formula was found to have a bland taste while the adhesive formulation made with the canary waxy dextrin had a burnt flavor.

With respect to the appearance, it was found that a dry formulation of 100 grams of waxy maize white dextrin and 120 grams waxy maize starch hydrolysate yielded a PSA dry color (Z-value) of 92.3 while a dry blend of 100 grams of a canary waxy maize dextrin and 120 grams of a waxy maize starch hydrolysate had a PSA dry color (Z-value) of 65.79. The higher the PSA number, the whiter the material.

The preferred formulation of a waxy maize white dextrin with a waxy maize starch hydrolysate provides good flavor and appearance making it a very suitable adhesive formulation for cigarette manufacturers.

It will be understood that the claims are intended to cover all changes and modifications of the preferred embodiments of the invention herein chosen for the purpose of illustration which do not constitute a departure from the spirit and scope of the invention.

What is claimed is:

1. An adhesive composition for use as a cigarette seam adhesive comprising a cooked aqueous blend of
   (a) about 10 to about 45 parts by weight of a high amylopectin starch dextrin, wherein said high amylopectin starch dextrin has at least about 70% by weight amylopectin and said high amylopectin starch dextrin has a cold funnel viscosity of about 20 to about 120 mls when measured at about 42% solids dry basis,
   (b) about 15 to about 60 parts by weight of a high amylopectin starch hydrolysate, wherein said high amylopectin starch hydrolysate has at least about 70% by weight amylopectin and said high amylopectin starch hydrolysate has a Dextrose Equivalent of about 10 to about 30, and
   (c) about 20 to about 60 parts by weight water,
   (d) said aqueous blend having a Brookfield viscosity of about 500 to about 15,000 cps when measured at a solids content of about 60% by weight, about 20 rpm, and a temperature of about 25° C.

2. The adhesive composition of claim 1 wherein said blend comprises about 1:0.5 to about 1:4 parts by weight of dextrin to hydrolysate.

3. The adhesive composition of claim 1 wherein the dextrin is a waxy maize starch dextrin.

4. The adhesive composition of claim 1 wherein the hydrolysate is a waxy maize starch hydrolysate.

5. The adhesive composition of claim 1 wherein the adhesive composition has a solids content of above about 50% by weight.

6. The adhesive composition of claim 1 wherein the blend further comprises a preservative to control microbial growth.

7. The adhesive composition of claim 1 wherein the dextrin has a cold funnel viscosity of about 50 to about 80 mls.

8. The adhesive composition of claim 1 wherein the aqueous blend comprises about 20 to about 30 parts by weight of said high amylopectin starch dextrin, about 25 to about 45 parts by weight of said high amylopectin starch hydrolysate and about 30 to about 50 parts by weight of water.

9. The adhesive composition of claim 6 wherein the aqueous blend comprises about 20 to about 30 parts by weight of said high amylopectin starch dextrin, about 25 to about 45 parts by weight of said high amylopectin starch hydrolysate and about 30 to about 50 parts by weight of water.

10. The adhesive composition of claim 6 wherein said preservative is present in an amount of less than about 0.1%.

11. The adhesive composition of claim 1 wherein the dextrin has a cold funnel viscosity of about 50 to about 80 mls and said hydrolysate has a Dextrose Equivalent of about 15 to about 20.

12. An adhesive composition for use as a cigarette seam adhesive comprising a cooked aqueous blend of about 10 to about 45 parts by weight of a dextrin, about 15 to about 60 parts by weight of a starch hydrolysate and about 20 to about 60 parts by weight water, said dextrin being a waxy maize white dextrin having a cold funnel viscosity of about 20 to about 120 mls when measured at about 42% solids dry basis, said starch hydrolysate being a waxy maize starch hydrolysate having a Dextrose Equivalent of about 10 to about 30, and said blend having a Brookfield viscosity of about 500 to about 15,000 cps when measured at 60% solids, about 20 rpm, and a temperature of about 25° C.

13. The adhesive composition of claim 12 further comprising below about 0.1% of a preservative to control microbial growth.

14. The adhesive composition of claim 12 wherein the dextrin has a cold funnel viscosity of about 50 to about 80 mls and said hydrolysate has a Dextrose Equivalent of about 15 to about 20.

15. The adhesive composition of claim 12 wherein the aqueous blend comprises about 20 to about 30 parts by weight of said waxy maize white dextrin, about 25 to about 45 parts by weight of said waxy maize hydrolysate and about 30 to about 50 parts by weight of water.

16. In a method for manufacturing a cigarette with a paper outer layer, the improvement comprising using as an adhesive for the longitudinal seam of said paper a cooled aqueous blend comprising
   (a) about 10 to about 45 parts by weight of a high amylopectin starch dextrin, wherein said high amylopectin starch dextrin has at least about 70% by weight amylopectin and said high amylopectin starch dextrin has a cold funnel viscosity of about 20 to about 120 mls when measured at about 42% solids dry basis,
   (b) about 15 to about 60 parts by weight of a high amylopectin starch hydrolysate, wherein said high amylopectin starch hydrolysate has at least about 70% by weight amylopectin and said high amylopectin starch hydrolysate has a Dextrose Equivalent of about 10 to about 30, and
   (c) about 20 to about 60 parts by weight water, and
   (d) said aqueous blend having a Brookfield viscosity of about 500 to about 15,000 cps when measured at a solids content of about 60% by weight, about 20 rpm, and a temperature of about 25° C.

17. The method of claim 16 wherein the aqueous blend comprises about 20 to about 30 parts by weight of said dextrin, about 25 to about 45 parts by weight of said hydrolysate and about 30 to about 50 parts by weight of water.

18. The method of claim 17 wherein said dextrin is a waxy maize dextrin having a cold funnel viscosity of about 50 to about 80 mls and said hydrolysate is a waxy maize starch hydrolysate with a Dextrose Equivalent of about 15 to about 20.

19. The method of claim 16 further comprising below about 0.1% of a preservative to control microbial growth.

20. The method of claim 16 further including a filter and wherein said adhesive is used to secure the filter to said paper.

* * * * *

UNITED STATES PATENT AND TRADEMARK OFFICE
CERTIFICATE OF CORRECTION

PATENT NO.   : 5,490,875
DATED        : February 13, 1996
INVENTOR(S)  : Vilas Wermers et al.

It is certified that error appears in the above-indentified patent and that said Letters Patent is hereby corrected as shown below:

Column 6, line 8, change "3D" to --30--.

Column 8, line 21 (claim 15), after "maize" insert --starch--.

Signed and Sealed this

Twenty-eighth Day of May, 1996

Attest:

BRUCE LEHMAN

Attesting Officer        Commissioner of Patents and Trademarks